US008882014B2

(12) United States Patent
Niitsuma et al.

(10) Patent No.: US 8,882,014 B2
(45) Date of Patent: Nov. 11, 2014

(54) FISHING-REEL REEL UNIT AND FISHING REEL

(75) Inventors: Akira Niitsuma, Osaka (JP); Kenji Tsubouchi, Hyogo (JP); Seiji Takaki, Osaka (JP)

(73) Assignee: Shimano Inc., Osaka (JP)

( * ) Notice: Subject to any disclaimer, the term of this patent is extended or adjusted under 35 U.S.C. 154(b) by 140 days.

(21) Appl. No.: 13/594,311

(22) Filed: Aug. 24, 2012

(65) Prior Publication Data

US 2013/0087647 A1    Apr. 11, 2013

(30) Foreign Application Priority Data

Oct. 6, 2011 (JP) ................................. 2011-221582

(51) Int. Cl.
*A01K 89/01* (2006.01)
*A01K 89/00* (2006.01)
(52) U.S. Cl.
CPC ...................................... *A01K 89/00* (2013.01)
USPC ......................................................... 242/310
(58) Field of Classification Search
CPC .... A01K 89/00; A01K 89/01; A01K 89/0102
USPC .......... 242/310, 311, 312, 313, 314, 315, 317
See application file for complete search history.

(56) References Cited

U.S. PATENT DOCUMENTS

| | | | | |
|---|---|---|---|---|
| 5,150,854 A | * | 9/1992 | Noda | 242/310 |
| 6,070,822 A | * | 6/2000 | Zwayer et al. | 242/310 |
| 6,607,154 B2 | * | 8/2003 | Hitomi | 242/322 |
| 7,150,423 B2 | * | 12/2006 | Kawasaki | 242/310 |
| 7,413,138 B2 | * | 8/2008 | Kitajima et al. | 242/311 |
| 7,628,348 B2 | * | 12/2009 | Saito | 242/311 |
| 2003/0111569 A1 | | 6/2003 | Hitomi | |
| 2004/0041046 A1 | * | 3/2004 | Nishimura | 242/310 |
| 2005/0056716 A1 | * | 3/2005 | Kawasaki | 242/310 |

FOREIGN PATENT DOCUMENTS

| | | |
|---|---|---|
| EP | 1400373 A2 | 3/2004 |
| JP | 2004-082612 A | 3/2004 |

OTHER PUBLICATIONS

Extended European Search Report of the corresponding European Application No. 12187184.2, dated Feb. 6, 2013.

* cited by examiner

*Primary Examiner* — Emmanuel M Marcelo
(74) *Attorney, Agent, or Firm* — Global IP Counselors

(57) ABSTRACT

A reel unit for a fishing reel includes a cover member, a first member, and a second member. The cover member is made of a metal plate. The first member is made of metal. The first member is welded to an inner side of the cover member, and is configured to protrude from the cover member. The second member is made of synthetic resin. The second member is integrally formed with the cover member and the first member to at least partially cover the first member.

11 Claims, 10 Drawing Sheets

FISHING-REEL REEL UNIT AND FISHING REEL

CROSS-REFERENCE TO RELATED APPLICATIONS

This application claims priority to Japanese Patent Application No. 2011-221582 filed on Oct. 6, 2011. The entire disclose of Japanese Patent Application No. 2011-221582 is hereby incorporated herein by reference.

BACKGROUND OF THE INVENTION

1. Field of the Invention

The present invention relates to a fishing-reel reel unit and a fishing reel, and particularly to, a fishing-reel reel unit including a cover member and a fishing reel.

2. Background Art

Fishing reels, which are attached to a fishing rod for winding and releasing a fishing line, are mainly classified into spinning reels and dual-bearing reels. The fishing reels of these types normally include a reel unit, a spool shaft and a spool. The reel unit is attached to the fishing rod. The spool shaft is supported by the reel unit. The spool is mounted onto the spool shaft for winding the fishing line. The spool for a dual-bearing reel is rotatably supported by the reel unit, whereas the spool for a spinning reel is mounted to the reel unit while being movable back and forth.

In the fishing reels as described above, the reel unit includes a main body member and a cover member. The main body member includes an opening part and accommodates a variety of mechanisms in the inside thereof The cover member closes the opening part of the main body member. The cover member of this type is a thin member made of synthetic resin or light metal (e.g., aluminum alloy, magnesium alloy, etc.). Further, an inner member made of synthetic resin is fixed to the back surface of the cover member by bonding (see Japan Laid-open Patent Application Publication No. JP-A-2004-082612). Before the structure became popular, a structure had been known that the inner member is swaged or fixed by screwed to the cover member.

SUMMARY

The well-known cover member has the structure in which the inner member made of synthetic resin is only fixed to the back surface of the cover member by bonding. Therefore, the inner member can be removed from the cover member, for instance, when bonding force is degraded between the inner member and the cover member due to aging degradation or etc.

Regarding the structure in which the inner member is swaged or fixed by screws to the cover member, on the other hand, holes for swaging or screw holes are exposed on the surface of the cover member. Therefore, aesthetic appearance of the cover member can be deteriorated.

In is an advantage of the present invention to keep better aesthetic appearance of a cover member made of metal, and simultaneously, prevent an inner member from being easily removed from the cover member in a reel unit for a fishing reel.

A reel unit for a fishing reel includes a cover member, a first member, and a second member. The cover member is made of a metal plate. The first member is made of metal. The first member is welded to an inner side of the cover member, and is configured to protrude from the cover member. The second member is made of synthetic resin. The second member is integrally formed with the cover member and the first member to at least partially cover the first member.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
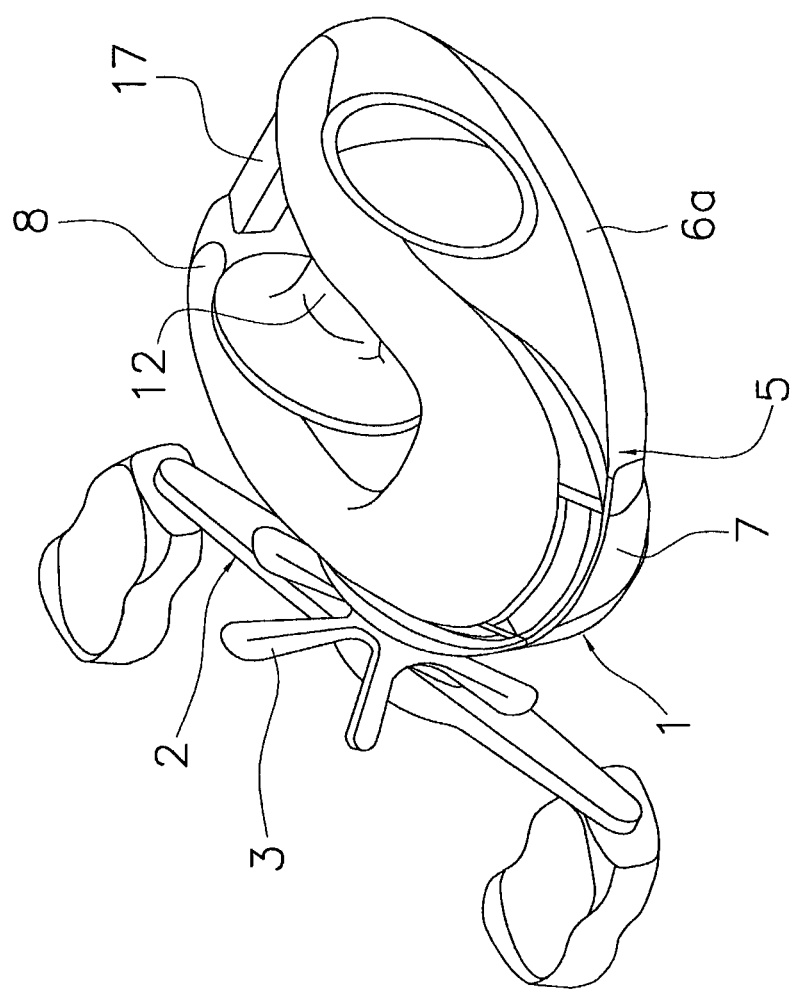
FIG. 1 is a perspective view of a dual-bearing reel employing an exemplary embodiment of the present invention.

As illustrated in FIG. 1, a fishing reel according to an exemplary embodiment of the present invention is a low-profile dual-bearing reel for bait casting. The dual-bearing reel includes a reel unit 1, a handle 2, and a star drag 3. The handle 2, which is used for rotating a spool, is disposed on a lateral side of the reel unit 1. The star drag 3, which is used for regulating drag, is disposed on a reel unit 1 side of the handle 2.

Figure 2:
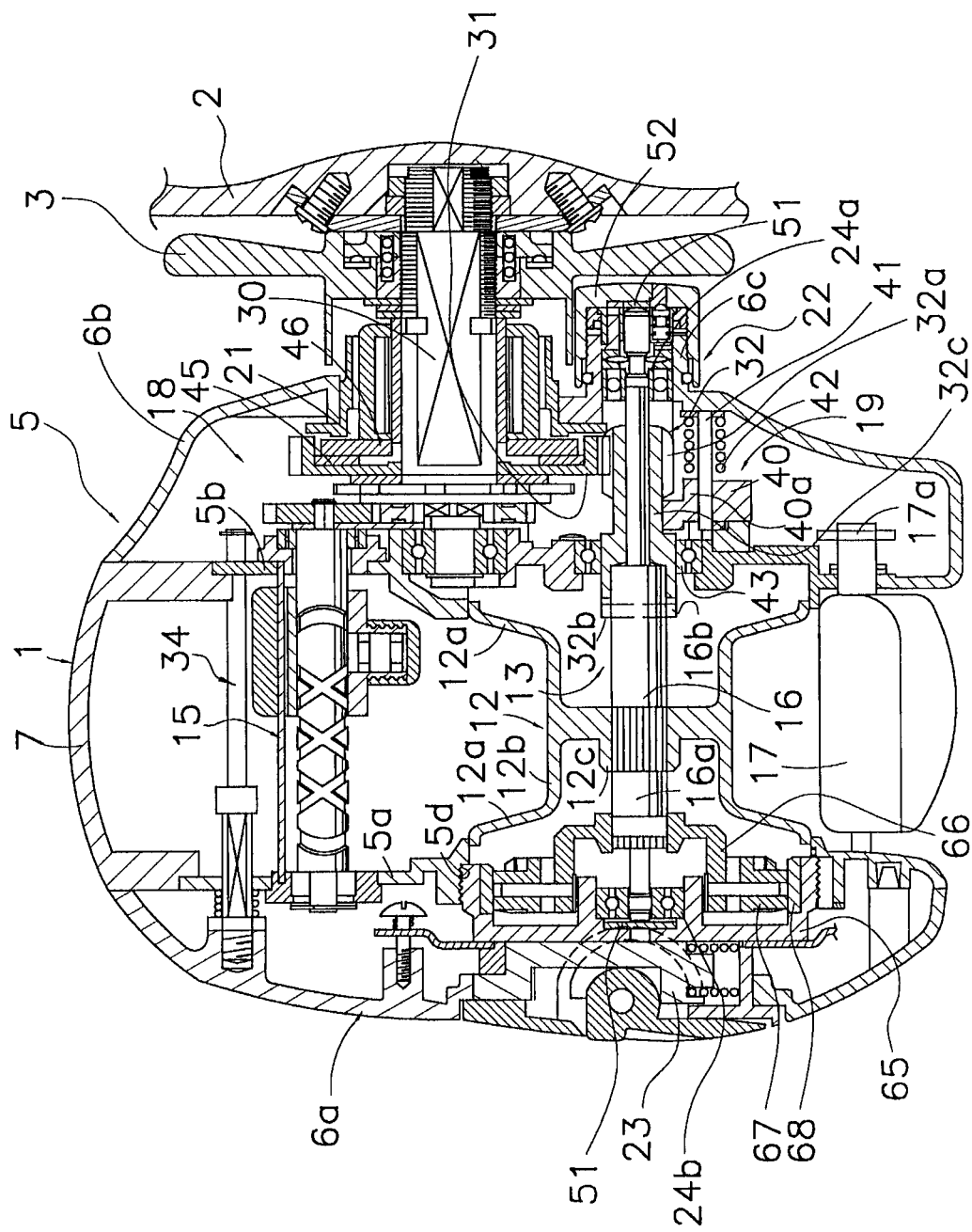
FIG. 2 is a cross-sectional view of the dual-bearing reel.

As illustrated in FIG. 2, the reel unit 1 includes a frame 5, a first side cover 6a, and a second side cover 6b. The first-side and second-side covers 6a and 6b are attached to the both lateral sides of the frame 5. As illustrated in FIG. 1, the reel unit 1 further includes a front cover 7 and a thumb rest 8. The front cover 7 covers the front side of the reel unit 1, while the thumb rest 8 covers the top side of the reel unit 1. A spool 12 for winding a fishing line is rotatably and detachably mounted in the inside of the reel unit 1.

The frame 5 includes a pair of first side plate 5a and a second side plate 5b and a plurality of coupling portions (not illustrated in the figures). The first and second plates 5a and 5b are opposed at a predetermined interval. The plural coupling portions couple the first and second side plates 5a and 5b.

As illustrated in FIG. 1, the thumb rest 8 is a cover member for covering the top part of the frame 5. More specifically, the thumb rest 8 is a roughly U-shaped cover member for covering the entirety of the frame 5. The thumb rest 8 is integrally formed for ranging from the rear part to the front part of the first side plate 5a, then ranging from the front part of the first side plate 5a to the front part of the second side plate 5b on the front-side coupling portion, and further ranging from the front part to the rear part of the second side plate 5b.

Figure 3:
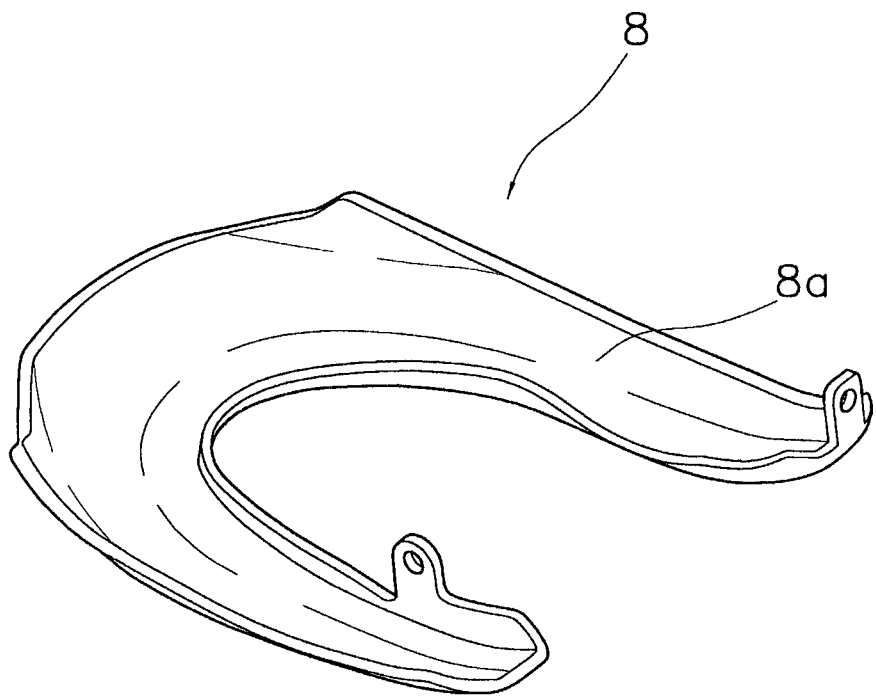
FIG. 3 is a perspective view of a thumb rest of the dual-bearing reel seen from the back surface thereof.
Figure 4:
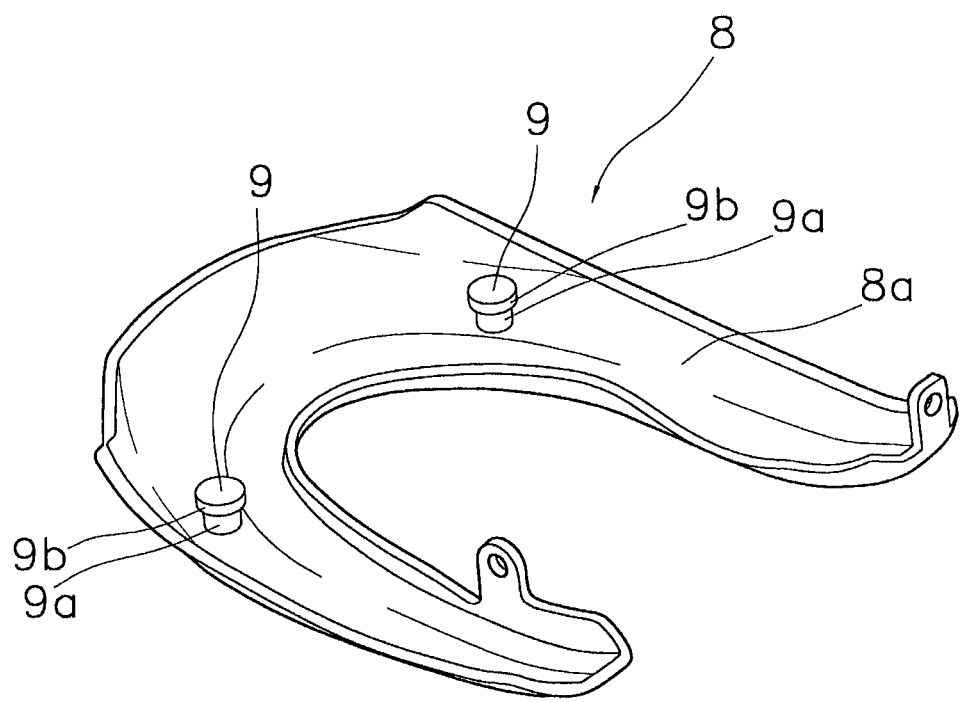
FIG. 4 is a perspective view of the thumb rest where first members are welded thereto.
Figure 5:
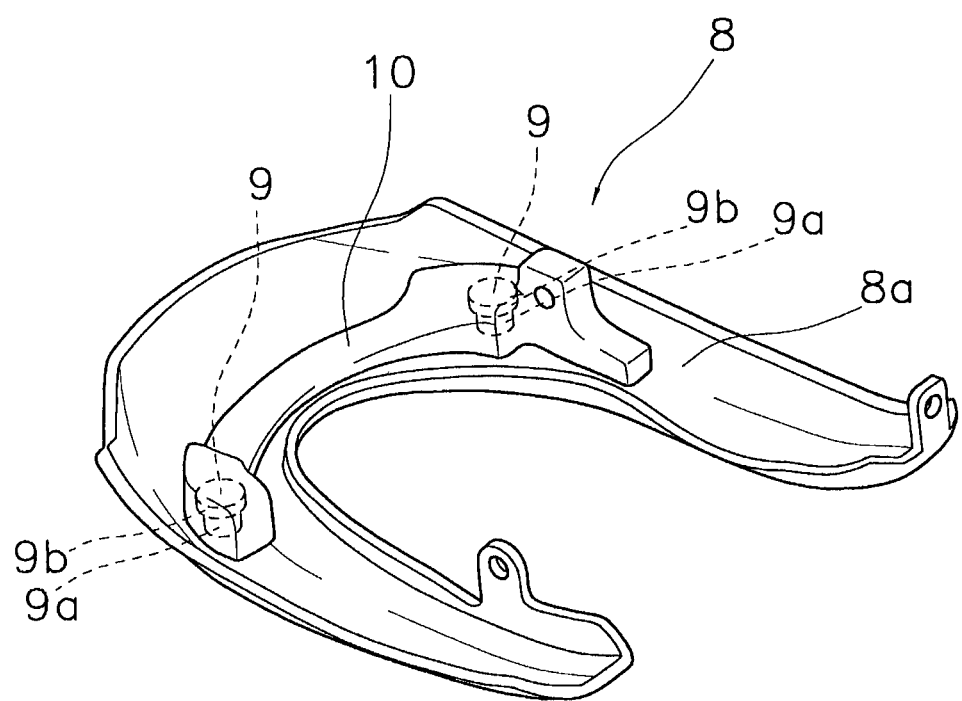
FIG. 5 is a perspective view of the thumb rest including the first members where a second member is molded thereto.

As illustrated in FIGS. 3 to 5, the thumb rest 8 is a member made of aluminum alloy and is formed by pressing. As illustrated in FIGS. 4 and 5, first members 9 made of aluminum alloy are welded to a back surface 8a of the thumb rest 8 wherein the first members protrude therefrom. As illustrated in FIG. 5, a second member 10 made of synthetic resin is integrally formed and arranged with the thumb rest 8 and the first members 9 by molding for entirely covering the first members 9. In this case, the first members 9 are welded to the back surface 8a of the thumb rest 8 made of aluminum alloy while being protruding therefrom. Further, the second member 10 made of synthetic resin is molded with the thumb rest 8 and the first members 9 for entirely covering the first members 9.

As illustrated in FIGS. 4 and 5, the first members 9 are two pin members made of aluminum alloy and are stud welded to the back surface 8a of the thumb rest 8 at two positions. The stud welding is a method of welding for automatically executing welding in a short period of time. In actually executing welding, the first members 9 (i.e., studs or pins) are loaded on a special stud welding gun, and the special stud welding gun is turned on while the first members 9 are pressed onto the thumb rest 8 one by one. A so-called CD (Capacitor Discharge) method is herein employed in executing the stud welding. The CD method is a stud welding method of welding the first members 9 to the thumb rest 8 by charging a large capacity condenser by a relatively small capacity AC power source and instantly discharging electric current between the first members 9 and the thumb rest 8.

Figure 6:
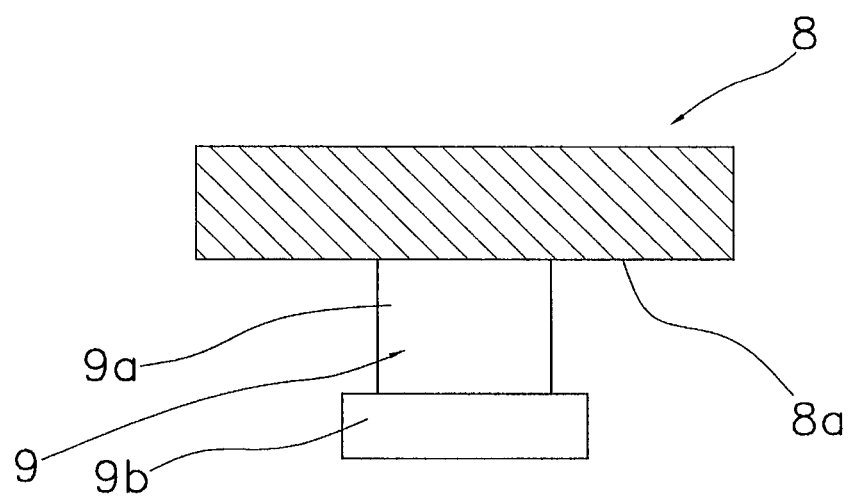
FIG. 6 is an enlarged cross-sectional view of the thumb rest where the first members are welded thereto.
Figure 7:
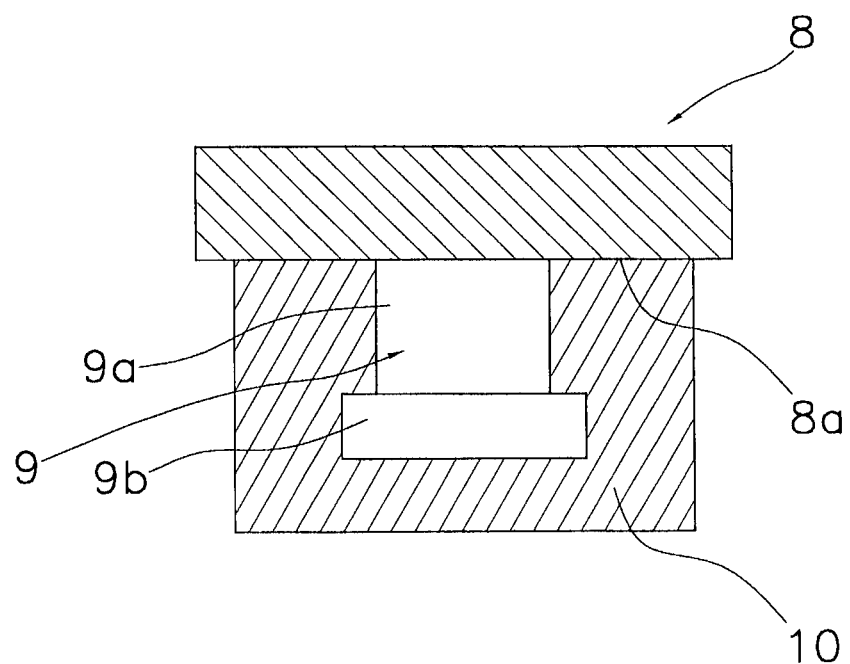
FIG. 7 is an enlarged cross-sectional view of the thumb rest including the first members where the second member is molded thereto.

As illustrated in FIGS. 6 and 7, the first members 9 are formed for allowing the second member 10 to be locked with the first members 9 when the second member 10 is molded. Each first member 9 is a pin member having a main body 9a and a single large diameter portion 9b (an example of a locking portion). One end of the main body 9a is welded to the thumb rest 8. The large diameter portion 9b is formed on the other end of the main body 9a and has a diameter greater than that of the main body 9a. The lathe diameter portion 9b can be locked with the second member 10. In this case, the second member 10 is designed to be locked with the lathe diameter portions 9b of the first members 9 when being molded to the thumb rest 8 and the first members 9. Therefore, the large diameter portions 9b of the first members 9 function as elements for anchoring the second member 10.

As illustrated in FIG. 5, the second member 10 is a roughly crescent-shaped member formed on the back surface 8a of the thumb rest 8 by injection molding of polyamide (PA) for attaching the thumb rest 8 to the frame 5.

Figure 8:
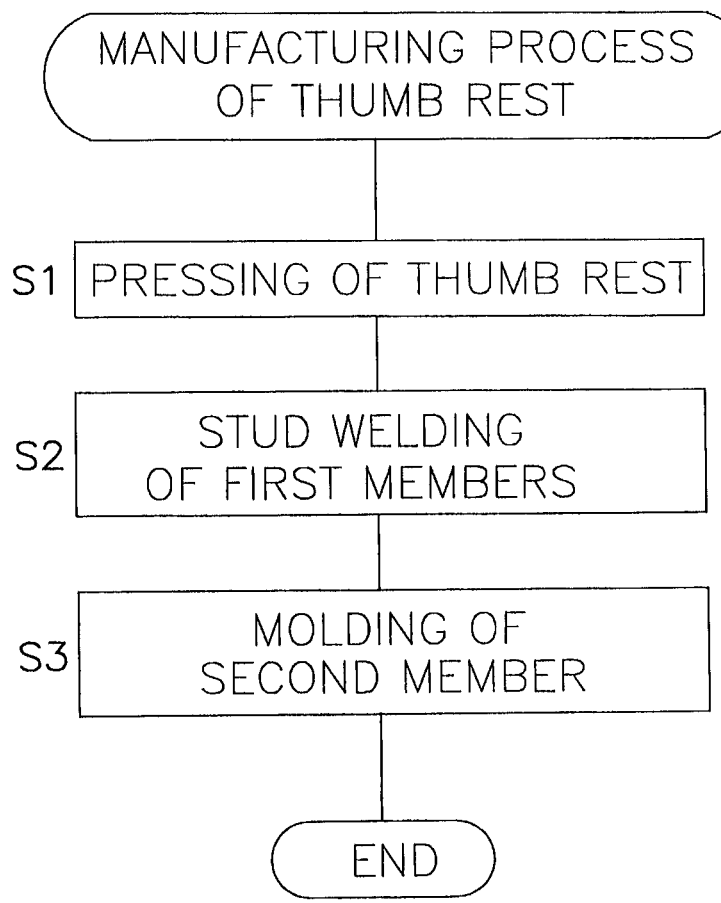
FIG. 8 is a chart showing a manufacturing process of the thumb rest.

FIG. 8 shows steps of manufacturing the aforementioned thumb rest 8.

First in Step S1, the thumb rest 8 is formed by pressing a plate member made of aluminum alloy (see FIG. 3). Next in Step S2, two first members 9 made of aluminum alloy are stud welded to the back surface 8a of the thumb rest 8 while being protruding therefrom (see FIGS. 4 and 6). Next in Step S3, the second member 10 is integrally formed with the first member 9 by injection molding of polyamide (PA) for entirely covering the first members 9 (see FIGS. 5 and 7).

As illustrated in FIG. 2, the frame 5 accommodates therein the spool 12, a level winding mechanism 15 and a clutch lever 17. The spool 12 is disposed in a direction perpendicular to a fishing rod. The level winding mechanism 15 is configured to uniformly wind the fishing line onto the spool 12. The clutch lever 17 functions as a thumb pad in thumbing the fishing line. The spool 12 can pass through an opening 5d of the first side plate 5a. Further, a gear mechanism 18, a clutch mechanism 13, a clutch engaging/disengaging mechanism 19, a drag mechanism 21, and a casting control mechanism 22 are disposed between the frame 5 and the second side cover 6b. The gear mechanism 18 is configured to transmit rotational force from the handle 2 to the spool 12 and the level winding mechanism 15. The clutch engaging/disengaging mechanism 19 is configured to control and engage/disengage the clutch mechanism 13 in accordance with an operation of the clutch lever 17. The casting control mechanism 22 is configured to regulate resistive force to be caused during rotation of the spool 12. Further, a centrifugal braking mechanism 23 is disposed between the frame 5 and the first side cover 6a for inhibiting occurrence of backlash in casting.

As illustrated in FIG. 2, the spool 12 is formed by cutting aluminum alloy and has a bobbin trunk 12b, a pair of flanges 12a, and a boss 12c. The bobbin trunk 12b is a tubular portion for winding the fishing line about the outer periphery thereof. The flanges 12a are protruding radially outwards from the both axial ends of the bobbin trunk 12b. The boss 12c is formed in the inner peripheral part of the bobbin trunk 12b. The inner periphery of the boss 12c is fixed onto a spool shaft 16. The bobbin trunk 12b, the flanges 12a and the boss 12c are integrally formed by a member made of aluminum alloy. The spool 12 is non-rotatably fixed onto the spool shaft 16, for instance, by serration coupling. The method of fixing the spool 12 onto the spool shaft 16 is not limited to methods using convex and concave (e.g., serration coupling). A variety of coupling methods (bonding, insert molding, etc.) can be used as the method of fixing the spool 12 onto the spool shaft 16.

As illustrated in FIG. 2, the spool shaft 16 is formed in a rod shape by cutting stainless alloy. The spool shaft 16 extends outwards of the second side cover 6b while penetrating through the second side plate 5b. One end (i.e., the extended end) of the spool shaft 16 is rotatably supported by a boss 6c formed on the second side cover 6b through a bearing 24a. On the other hand, the other end of the spool shaft 16 is rotatably supported within the centrifugal braking mechanism 23 through a bearing 24b. The bearings 24a and 24b are shield ball bearings. The right end of a large-diameter portion 16a of the spool shaft 16 is disposed within the penetrated part of the second side plate 5b. An engaging pin 16b, which forms a part of the clutch mechanism 13, is fixed to the right end of the large-diameter portion 16a. The engaging pin 16b penetrates the large-diameter portion 16a along its diameter while the both ends thereof are radially protruding therefrom.

As illustrated in FIG. 2, the gear mechanism 18 includes a handle shaft 30, a main gear 31 and, a pinion gear 32. The main gear 31 is fixed onto the handle shaft 30. The pinion gear 32 is a tubular gear meshing with the main gear 31. To reduce the height of the thumb rest 8, the vertical position of the handle shaft 30 of the gear mechanism 18 is lower than that in the well-known structure. Therefore, the lower parts of the second side plate 5b and the second side cover 6b, which accommodate the gear mechanism 18, are positioned lower than the lower parts of the first side plate 5a and the first side cover 6a.

As illustrated in FIG. 2, the pinion gear 32 is a tubular member that the spool shaft 16 penetrates the center part thereof The pinion gear 32 extends from the outside to the inside of the second side plate 5b. The pinion gear 32 is mounted onto the spool shaft 16 while being axially movable. Further, the left end (see FIG. 2) of the pinion gear 32 is supported by the second side plate 5b through a bearing 43 while being rotatable and axially movable. As illustrated in FIG. 2, the bearing 43 is also a shield ball bearing.

The pinion gear 32 has a teeth portion 32a, a meshing portion 32b, and a narrowed portion 32c. The teeth portion 32a is formed on the outer periphery of the right end (see FIG. 2) of the pinion gear 32 for meshing with the main gear 31. The meshing portion 32b is formed on the other end (i.e., the left end) of the pinion gear 32. The narrowed portion 32c is formed between the teeth portion 32a and the meshing portion 32b. The meshing portion 32b is a recessed groove formed on the end surface of the pinion gear 32 along the diameter of the pinion gear 32. The engaging pin 16b, which is fixed to the spool shaft 16 while penetrating therethrough, is engaged with the recessed groove. When the pinion gear 32 is herein moved outwards and the engaging pin 16b of the spool shaft 16 is disengaged from the meshing portion 32b of the pinion gear 32, the rotational force from the handle shaft 30 is not transmitted to the spool 12. The clutch mechanism 13 is formed by the meshing portion 32b and the engaging pin 16b. When the engaging pin 16b and the meshing portion 32b are engaged, torque is directly transmitted to the spool shaft 16 from the pinion gear 32 having a diameter greater than that of the spool shaft 16. Therefore, torsional deformation is less produced and torque transmission efficiency will be enhanced.

As illustrated in FIG. 2, the clutch lever 17 is disposed behind the spool 12 while being disposed on the rear part of the space interposed between a pair of the first side plate 5a and the second side plate 5b.

As illustrated in FIG. 2, the clutch engaging/disengaging mechanism 19 includes a clutch yoke 40. The clutch yoke 40 is disposed on the outer peripheral side of the spool shaft 16. The clutch yoke 40 is supported by two pins 41 (only one of the pins 41 is illustrated) while being movable in parallel to the axis of the spool shaft 16. Further, the clutch yoke 40 has an engaging portion 40a on the middle part thereof. The engaging portion 40a is engaged with the narrowed portion 32c of the pinion gear 32. Further, a spring 42 is disposed on the outer periphery of each of the pins 41 supporting the clutch yoke 40 while being disposed between the clutch yoke 40 and the second side cover 6b. The clutch yoke 40 is constantly urged inwards by the springs 42.

With the structure, the pinion gear 32 is normally positioned in an inward clutch engaged position. More specifically, the meshing portion 32b of the pinion gear 32 and the engaging pin 16b of the spool shaft 16 are engaged and thus a clutch-on state is produced. On the other hand, when the pinion gear 32 is moved outwards by the clutch yoke 40, the meshing portion 32b and the engaging pin 16b are disengaged from each other and thus a clutch-off state is produced.

The drag mechanism 21 includes a friction plate 45 and a pressure plate 46. The friction plate 45 is configured to be pressed by the main gear 31. The pressure plate 46 serves to press the friction plate 45 towards the main gear 41 with predetermined force in conjunction with a rotary operation of the star drag 3.

The casting control mechanism 22 includes a plurality of friction plates 51 and a brake cap 52. The friction plates 51 abut to the both ends of the spool shaft 16 from the axially outside of the spool shaft 20. The brake cap 52 is configured to regulate abutting pressure of the friction plates 51 against the spool shaft 16. The left-side friction plate 51 is attached to the inside of a brake case 65.

As illustrated in FIG. 2, the centrifugal braking mechanism 23 includes a brake member 68, a rotary member 66, and six moving members 67. The brake member 68 is fixed to the brake case 65. The rotary member 66 is fixed to the spool shaft 16 while being concentrically disposed on the inner peripheral side of the brake member 68. The moving members 67 are mounted to the rotary member 66 while being radially movable.

According to the dual-bearing reel with the aforementioned structure, the first members 9 made of aluminum alloy are stud welded to the back surface 8a of the thumb rest 8 made of aluminum alloy while protruding therefrom. Further, the second member 10 made of synthetic resin is molded to the thumb rest 8 and the first members 9 for entirely covering the first members 9. In this case, the first members 9 are welded to the back surface 8a of the thumb rest 8 while being protruding therefrom, and the second member 10 is molded to the thumb rest 8 and the first members 9 for entirely covering the first members 9. Therefore, better aesthetic appearance can be kept for the thumb rest 8, and simultaneously, the second member 10 can be prevented from being easily removed from the thumb rest 8.

Other Exemplary Embodiments (a) The thumb rest 8 of a dual-bearing reel has been exemplified for explaining the fishing component according to the present invention. However, the fishing component of the present invention is not limited to the above. For example, the present invention can be applied to an element of the reel unit (e.g., the first side cover 6a, the second side cover 6b, the front cover 7, etc.). Further, the present invention can be applied to an element of the reel unit (e.g., a lid member) of a spinning reel as well as an element of the reel unit of a dual-bearing reel.

(b) In the aforementioned exemplary embodiment, the thumb rest 8 and the first members 9 are made of aluminum alloy. However, the thumb rest 8 and the first members 9 can be made of metal such as magnesium alloy. Further, the second member 10 is formed by injection molding of polyamide (PA). However, the second member 10 can be made of synthetic resin such as polyethylene (PE) or polyacetal (POM).

(c) In the aforementioned exemplary embodiment, the first members 9 are welded to the thumb rest 8 by stud welding employing a CD method. However, the first members 9 can be welded to the thumb rest 8 by stud welding employing a power arc method, a short cycle method, or etc.

(d) In the aforementioned exemplary embodiment, the second member 10 is molded to the thumb rest 8 and the first members 9 for entirely covering the first members 9. However, the second member 10 can be molded to the thumb rest 8 and the first members 9 for partially covering the first members 9. In this case, a part of the first members 9, not covered with the second member 10, can be used for positioning the thumb rest 8 and the first members 9 in inserting them into a mold of the second member 10, although the contour of the thumb rest 8 is used for positioning them in inserting them into the mold in the aforementioned exemplary embodiment.

(e) In the aforementioned exemplary embodiment, the two first members 9 are welded to the thumb rest 8 in two positions. However, the number of the first members 9 is not limited to two and can be one or greater than or equal to three.

Figure 9:
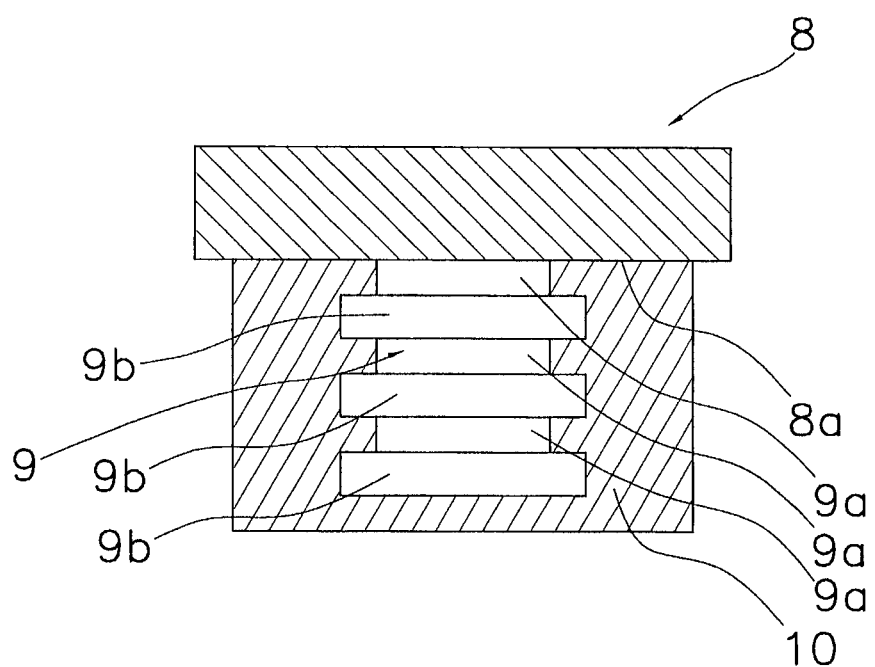
FIG. 9 corresponds to FIG. 7 and relates to another exemplary embodiment.

(f) In the aforementioned exemplary embodiment, each first member 9 has a single large diameter portion 9b. However, a plurality of (three in FIG. 9) the large diameter portions 9b can be provided as illustrated in FIG. 9.

Figure 10:
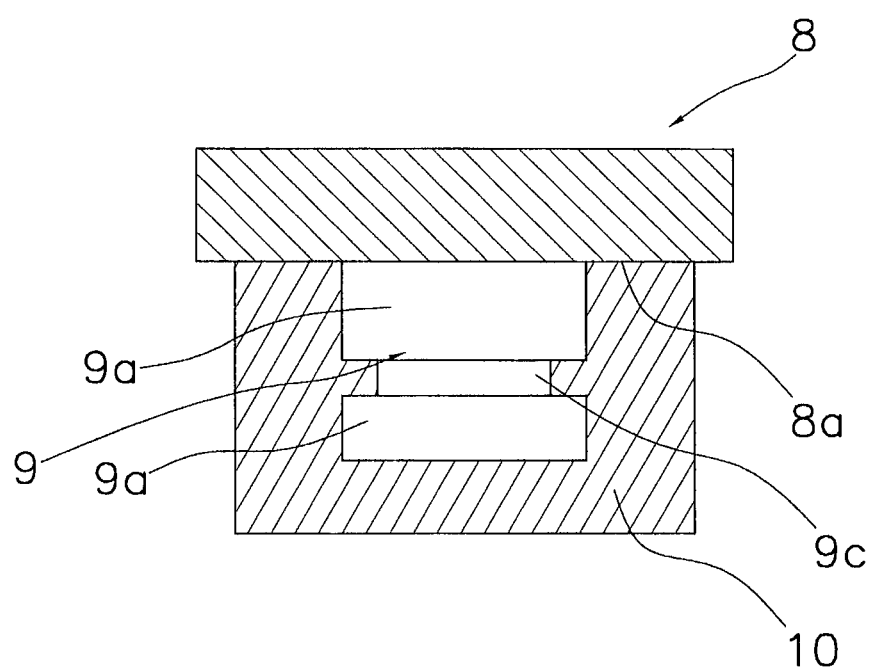
FIG. 10 corresponds to FIG. 7 and relates to yet another exemplary embodiment.

(g) In the aforementioned exemplary embodiment, each first member 9 has the large diameter portion 9b having a diameter greater than that of the main body 9a. However, a small diameter portion 9c having a diameter less than that of the main body 9a can be provided as illustrated in FIG. 10.

(h) In the aforementioned exemplary embodiment, each first member 9 is formed in a pin shape. However, each first member 9 can be formed as a locking portion in a block shape having an aperture on the outer peripheral surface thereof.

Advantageous Effects of the Invention

Overall, according to the present invention, in the reel unit of the fishing reel, the first member is welded to the inner side of the cover member while being protruding therefrom, whereas the second member is molded to the cover member and the first member for covering the first member. Therefore, better aesthetic appearance of the cover member can be maintained, while the second member can be prevented from being easily removed from the cover member.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A reel unit for a fishing reel, comprising:
   a cover member made of a metal plate;
   a first member made of metal, the first member welded to an inner side of the cover member, the first member configured to protrude from the cover member; and
   a second member made of synthetic resin,
   the second member being integrally formed with the cover member and the first member to at least partially cover the first member.

2. The reel unit for the fishing reel according to claim 1, wherein
   the second member is integrally formed with the first member to cover entirely the first member.

3. The reel unit for the fishing reel according to claim 1, wherein
   the second member is made by molding.

4. The reel unit for the fishing reel according to claim 3, wherein
   the first member includes a locking portion, the locking portion configured to engage with the second member in molding the second member.

5. The reel unit for the fishing reel according to claim 4, wherein
   the first member is a pin member,
   the pin member includes a main body and a large-diameter portion,
   one end of the main body is welded to the cover member,
   the large-diameter portion is formed on the other end of the main body,
   the large-diameter portion has a diameter greater than a diameter of the main body, and
   the large-diameter portion is configured to allow the second member to be engaged therewith.

6. The reel unit for the fishing reel according to claim 5, wherein
   the large diameter portion is one of a plurality of large diameter portions disposed on the main body.

7. The reel unit for the fishing reel according to claim 1, wherein
   the cover member is a plate member made of aluminum alloy, and
   the plate member is formed by pressing.

8. The reel unit for the fishing reel according to claim 1, wherein
   the first member is made of aluminum alloy.

9. The reel unit for the fishing reel according to claim 1, wherein
   the first member is stud welded to the cover member.

10. The reel unit for the fishing reel according to claim 1, further comprising
    a frame being configured to allow the cover member to be detachably attached to an upper part thereof;
    a first side cover being attached to a first lateral side of the frame; and
    a second side cover being attached to a second lateral side of the frame opposite to the first side, wherein
    the first member is welded to an inner surface of the cover member,
    the first member is configured to protrude from the inner surface of the cover member, and
    the inner surface opposed to the frame.

11. A fishing reel, comprising the reel unit according to claim 1.

* * * * *